United States Patent Office 3,761,308
Patented Sept. 25, 1973

3,761,308
PREPARATION OF PHOTOCONDUCTIVE FILMS

Guido Galli, Saratoga, Calif., assignor to International Business Machines Corporation, Armonk, N.Y.

No Drawing. Filed Nov. 22, 1971, Ser. No. 200,833
Int. Cl. B44c *1/18*; C23c *11/00*
U.S. Cl. 117—201 9 Claims

ABSTRACT OF THE DISCLOSURE

Adherent stress-free films of photoconductors are prepared on a substrate at temperatures below 150° C. by a gas phase reaction between a lower dialkyl zinc, cadmium or mercury gas and a chalcogen hydride in the presence of an inert gas diluent.

FIELD OF THE INVENTION

The present invention is concerned with the preparation of photoconductor films. In particular, it is concerned with the preparation of such films that adhere to a substrate, particularly a substrate which is sensitive to high temperature. The present invention provides a novel method for forming adherent photoconductive films at low temperature and makes it possible to deposit such films on substrates which would decompose at high temperatures.

PRIOR ART

U.S. Pat. 3,361,591 teaches that cadmium sulfide is generally evaporated from a single source onto a substrate. The patent also teaches the formation of a cadminum sulfide film by vaporizing independent sources of the elements.

U.S. Pat. 3,466,191 also teaches depositing cadmium and sulfur from different sources. The reaction here is between the elements themselves in a mixture of argon and oxygen under very low pressures. It is also most significant that this reaction requires that the substrate be at a temperature of from 180° to 200° C.

U.S. Pat. 3,472,679 shows the use of a carrier gas during a coating operation. The photoconductive elements being deposited, however, are different from the compounds involved in the present invention.

Journal of the Electrochemical Society, vol. 118, No. 4, p. 644 (1971) shows the reaction of dialkyl cadmium and zinc compounds with chalcogen hydride. This reference is concerned only with high temperature reaction above 475° C., and does not teach the use of high dilution with an inert gas.

SUMMARY OF THE INVENTION

The present invention provides a method of depositing a film of adherent, stress-free photoconductor at low temperature on a substrate. According to the present invention, a lower dialkyl zinc, cadmium or mercury gas is reacted at the surface of the substrate with a chalcogen hydride gas. The most useful lower dialkyl organometallic gases are the dimethyl and diethyl compounds. The expression chalcogen hydride is intended to mean hydrogen sulfide, hydrogen selenide and hydrogen telluride, and also includes mixtures of these, since the process of the present invention may suitably be used to prepare, for example, cadmium sulfoselenides.

In carrying out the reaction, the organometallic gas is usually reacted with at least a stoichiometric amount of the chalcogen hydride gas. It is preferred for some purposes to use an excess of the chalcogen hydride gas since this leads to the formation of films having higher resistivity.

It is an essential feature of the present invention that the reaction take place in the presence of an inert gas diluent. This inert gas may, for example, be nitrogen, helium, neon, argon, or the like. The vapor pressure of the inert gas should be very much greater than the vapor pressure of the organometallic gas. It is an empirical established fact that when the vapor pressure of the inert gas is not sufficiently high, much of the reaction product is deposited in the form of snow-like particles rather than as an adherent film. There is no upper limit to the vapor pressure of the inert gas, but obviously the higher it is, the slower the reaction will be. There does not seem to be any advantage obtained by using vapor pressures more than seven thousand times higher than that of the organometallic gas, and at such dilutions the reaction is quite slow. In general, it is preferred that the inert gas have a vapor pressure about 500 to 900 times that of the organometallic gas.

In the preparation of photoconductive films it is often desirable that they be placed on substrates having specified properties, for example, transparency and flexibility. The choice of suitable substrates is severaly limited if the reaction must be carried out at a high temperature. It is a particular advantage of the process of the present invention that it is carried out below 150° C., preferably at room temperature. Because of this a wide variety of heat sensitive polymeric materials which otherwise could not be used as substrates may now be used as substrates. One particularly suitable substrate is polyethylene terephthalate, which may be coated with a thin film of aluminum to make it electrically conductive. It is also an advantage of the process of the present invention that the films are strain-free. This advantage is believed to follow from the use of low temperatures.

While the invention has been particularly shown and described with reference to preferred embodiments thereof, it will be understood by those skilled in the art that various changes in the form and details may be made therein without departing from the spirit and scope of the invention.

EXAMPLE I

Dimethyl cadmium was stored in an air-tight metal container. The container was designed so helium could be bubbled (transpired) through the liquid. The saturated carrier gas was swept into a reaction vessel and directed onto the substrate surface by means of a suitable nozzle. The reaction vessel had previously been evacuated and refilled through a second nozzle with a gas mixture of $H_2S$ and He. The gases were maintained at a constant flow and the substrate was moved relative to the nozzles at a speed of 1 cm./min. producing a continuous coating process. The gas flows through the vessel were 3 cc./min. of DMC vapor, 2200 cc./min. of He and typically 400 cc./min. $H_2S$. All gas volumes measured at normal temperature and pressure. The film deposition rate was maximum for a ratio of gas volumes (partial pressures) of 700:1, He:DMC. The proportions of $H_2S$ added to the vessel beyond stoichiometric quantities did not affect the deposition rate but did serve to increase the electrical resistivity of the film. Increasing the He:DMC ratio to greater than 700:1 lowered the deposition rate. Decreasing the ratio to less than 700:1 did not increase the deposition rate on the substrate but did increase the gas-phase reaction, producing significant quantities of snow-like particles. Moving the substrate faster produced thinner deposits. A maximum deposition rate of $2.5 \times 10^{-4}$ cc./cm.²/min. CdS was measured for these conditions.

EXAMPLE II

In the process for the preparation of CdSe or $CdS_xSe_{1-x}$ hydrogen selenide was wholly or partially substituted for $H_2S$ but not in equivalent proportions. Because the reactivity of $H_2Se$ for the dialkyls is higher than that of $H_2S$, a lower concentration of this gas was required. Generally 100 times as much $H_2S$ pressure (volume) as $H_2Se$ was required to produce the same degree of stoichiometry in the finished film. All else was the same.

EXAMPLE III

Diethyl zinc was used in place of dimethyl cadmium in a process like that of Example I. The gas flow rate for the diethyl zinc was 2 cc./min. and the rate for helium was 1500 cc./min. The $H_2S$ rate was 380 cc./min. An adherent stress-free photoconductive film was obtained.

EXAMPLE IV

In a manner analogous to that shown above, similar results may be obtained using dimethyl mercury or diethyl mercury as the organometallic gas.

What is claimed is:

1. A process for depositing an adherent stress-free film of photoconductor on a substrate, said process comprising reacting in the presence of an inert gas diluent on the surface of the substrate at a temperature below 150° C., a lower dialkyl zinc, cadmium or mercury gas with a chalcogen hydride gas, with the vapor pressure of the inert gas being at least 500 times as great as the vapor pressure of the organo-metallic gas.

2. A process as claimed in claim 1 wherein the reaction is carried out at room temperature.

3. A process as claimed in claim 1 wherein an excess of chalcogen hydride gas is used.

4. A process as claimed in claim 1 wherein the chalcogen hydride gas is hydrogen sulfide.

5. A process as claimed in claim 1 wherein the chalcogen hydride gas is hydrogen selenide.

6. A process as claimed in claim 1 wherein the lower dialkyl cadmium gas is dimethyl cadmium.

7. A process as claimed in claim 1 wherein the lower dialkyl cadmium gas is diethyl cadmium.

8. A process as claimed in claim 1 wherein the substrate is a polymeric material.

9. A process as claimed in claim 8 wherein the polymeric material is polyethylene terephthalate.

References Cited

UNITED STATES PATENTS

| | | | |
|---|---|---|---|
| 3,466,191 | 9/1969 | Stinchfield | 117—201 |
| 3,462,323 | 8/1969 | Groves | 117—201 |
| 3,361,591 | 1/1968 | Dill | 117—201 |
| 3,333,985 | 8/1967 | Berkenblit | 117—201 |
| 2,706,792 | 4/1955 | Jacobs | 117—201 |

OTHER REFERENCES

Manasevit et al., "The Use of Metal-Organics in the Preparation of Semiconductor Materials," J. Electrochemical Society, April (1971), pp. 644–47.

Goodman, "Electrically Conducting Photoluminescent ZnSe Films," J. Electrochemical Society, March (1969), pp. 364–368.

ALFRED L. LEAVITT, Primary Examiner

M. F. ESPOSITO, Assistant Examiner

U.S. Cl. X.R.

117—107.2 R, 119